Patented Nov. 23, 1948

2,454,457

UNITED STATES PATENT OFFICE 2,454,457

METHOD OF MAKING DENTURES

Christe Joannides, Edgware, England

No Drawing. Application February 25, 1944, Serial No. 523,817. In Great Britain March 12, 1943

2 Claims. (Cl. 18—53)

This invention relates to dental rubbers and has for its object to provide a new kind of rubber for making full or partial dentures, which rubber is characterised by its strength and lightness which make it suitable for this purpose, and also by the fact that a suitable pink colour can be imparted to it after the dentures have been vulcanised and polished, thus overcoming the necessity of using two different coloured rubbers for the production of dentures. Heretofore the general practice in making dentures has been to use a base rubber to provide the necessary strength, and a pink facing rubber to give a suitable appearance to those parts of the denture which are visible.

Base rubber is manufactured in a wide variety of colours, such as red, orange, maroon or brown, by compounding rubber with sulphur and vermilion or cadmium red for colouring purposes, but no white pigment is used. Other base rubbers which are black or dark grey, containing no red colouring matter are also used but to a lesser extent. The colour variations may be said to be due to the manufacturers effort to obtain the maximum strength in a base rubber, and the colour range is left to the choice of the individual user.

The strength and lightness of base rubber containing red colouring matter is improved by reducing the ratio of colouring matter to the rubber content, but since no white pigment is used, the high percentage of rubber in the compound increases the tendency to expansion, the risk of distortion, the risk of rubber becoming porous in its vulcanized state and finally the risk of creepage of the vulcanite away from the teeth due to contraction when cooling after vulcanisation. These difficulties are particularly serious in the case of thick lower plates.

The pink facing rubber which is used in conjunction with a base rubber as above described is practically immune from expansion and contraction, and the consequent porosity, due to the large amount of white pigment incorporated in it. As compared with base rubber, however, the rubber content is a much lower proportion in the pink compound, with the result that its strength is considerably reduced and after vulcanisation it tends to be brittle. Also compared with base rubber, its weight is greatly increased due to the additional ingredients, in particular the red colouring matter which has a much higher specific gravity than has rubber.

The necessity of using a known pink rubber on visible portions of a denture complicates the production; because of the brittleness of the pink rubber, some dentists reinforce the pink-coloured portion from behind with base rubber, but in addition to the difficulty of backing the rubber in this way, there is a risk of the base rubber displacing the pink rubber so that it shows through, and mars the appearance of the finished denture. To avoid this difficulty, it is customary for the whole thickness of the visible coloured portion to be built up entirely of pink rubber, but this method not only tends to increase the weight of the denture, but it also considerably reduces its strength, and there is a risk of the teeth becoming detached during mastication. This difficulty of packing pink rubber and base rubber together has been largely overcome by the injection process of filling the moulds, since by this method the pink rubber is toughened before the base rubber is injected and remains in position as a true pink layer backed by injected base rubber giving a strong denture. Even when using this method, however, there is still the complication of using two different rubbers, and the object of this invention is to provide a base rubber of adequate strength and light weight which can have a satisfactory pink colour.

It has been proposed to make a pink base rubber, intended to be vulcanized for a period of one hour at a pressure of 100 lbs. but this particular compound contained less than 33% of rubber so that it was not of adequate strength and light weight and it did not find favour among dentists. Consequently the method still most commonly used is to apply a pink facing to a base rubber.

According to this invention, a rubber compound for making dentures is characterised in that it contains white and red pigments in a proportion which is insufficient to produce a pink colour after vulcanising, but is sufficient to enable a pink surface to be produced by subsequent treatment after vulcanising.

The invention also comprises a method of making a vulcanised denture, which includes the steps of moulding the improved material as above set forth, vulcanising it, polishing it and treating the exposed surface to change its colour to pink. The desired colour change may be produced by exposing the denture to the action of light and/or an oxidizing agent as hereinafter set forth in detail.

In carrying this invention into effect, crude rubber is compounded with sufficient sulphur to effect vulcanisation together with titanium dioxide and cadmium red. Titanium dioxide is a white pigment which has great obliterating power compared with zinc sulphide, lithopon, and cadmium red is used instead of vermilion because of its lower specific gravity. In cases where a higher weight is advantageous vermilion may be used instead of cadmium red.

The proportions of titanium dioxide and cadmium red are very much less than are those of zinc sulphide or lithopon and vermilion ordinarily used for pink facing rubber and the increased rubber content of the compound enables a satisfactory strength and weight to be obtained.

The colour of this new compound is pink before vulcanisation, but after vulcanisation it has light browning-pink to brownish colour unsuitable for initiation gums, the differences depending upon the percentage of crude rubber contained in the compound.

In a specific example, the compound may contain about 40% crude rubber and after the denture has been vulcanised its surface is polished and then, if exposed to sunlight, a pleasing pink colour is obtained. This change in colour is a surface only, so that the material thus differs from the usual pink facing rubber or pink base rubber which in their vulcanised state have the same colour throughout the mass. The pink colour obtained with the new compound above described varies with the percentage of crude rubber in the compound and the intensity of the light to which the polished surface is exposed.

If the proportion of crude rubber be increased above 40% to 50% or even 60% there is a corresponding decrease in the proportion of white pigment and colouring so that the finished denture is even stronger and lighter. The time of exposure to sunlight to obtain the desired pink colour may have to be increased in these circumstances.

Since sunlight is very variable, artificial light of high intensity or one giving a strong actinic light may be used as an alternative or in addition to sunlight.

It has also been found that the colour produced in the vulcanised rubber is affected if accelerators are used to reduce the time of vulcanisation in the well-known manner. In the examples given above the time of vulcanisation may be about one hour, but if accelerators be used to reduce the vulcanising time to say half an hour, it is found that the denture has a lighter colour which facilitates the production on it of the desired pink colour after it has been polished. This effect of accelerators is particularly advantageous as the percentage of crude rubber in the compound is increased, and with high percentages of rubber it may be essential to use accelerators to obtain the desired colour.

An alternative method of reducing the vulcanising time is to improve the thermal conductivity of the plaster-cast in which the denture is made, and this may be effected by mixing with it metal powder or particles; aluminium is a suitable metal as it is unaffected by sulphur and it has a high heat conductivity. By using a mixture of three or four parts of plaster to one of metal, the vulcanising period can be reduced by about one half, although of course this depends upon the size of the flask in which the rubber is vulcanised. This reduction of the time of vulcanising also is beneficial in facilitating the production of the desired pink colour, and it may be used in conjunction with accelerators so that the time of vulcanising can be very substantially reduced, say to one quarter of the normal time, and the vulcanite so produced having a somewhat lighter colour.

In a modification of the process of producing the pink colour, the vulcanite may be subjected to an oxidising agent. Whilst this will in some cases produce the desired change of colour, it is highly advantageous to use it in conjunction with the exposure to light above described. In one example, vulcanite having about 40% crude rubber content is immersed in a weak solution of hydrogen peroxide, say 2% to 3% by volume for a period up to twelve hours, say overnight, and is then exposed to light as above described, and it is found that there is a considerable reduction in the time required for obtaining the desired pink colour. If the percentage of crude rubber is increased, it is desirable to increase also the strength of the solution. For example, with a compound containing 50% of crude rubber, the strength of the solution may be increased to 4% or 5% by volume.

The treatment of the vulcanite with the oxidising agent bleaches it, or lightens its colour, and if strong solutions are used, care is necessary, but in the event of excessive bleaching having taken place, the vulcanite can be repolished to restore the original colour and the operation of bleaching recommenced.

Experiment has shown that there are a large number of factors governing the production of the desired pink colour, and the time necessary to obtain it and the process must therefore be adjusted in accordance with these factors. The quality and purity of the crude rubber which is used must be taken into consideration, since wild rubber gives a somewhat darker colour to the vulcanite than cultivated rubber. Also the purity of the pigments and obliterating power and the other ingredients compounded with the rubber are important, in obtaining uniform results, and it is particularly desirable to avoid over-vulcanisation of the vulcanite as this tends to produce a darker colour.

When accelerators with or without activators are used, the effects on the rubber are governed almost entirely by the time of vulcanisation, so that the choice of these materials may be left to the individual manufacturers.

When it is important to reduce the time of manufacture of the finished denture, the change in colour in the polished surface on exposure to light may be produced instantaneously or practically so, by using, instead of a hydrogen peroxide solution, a chlorinated solution of an oxidising agent such as benzoyl peroxide in a solvent such as chloroform, methylene chloride, or other chlorinated solvent. Other peroxides may be used but benzoyl peroxide is the most satisfactory. The benzoyl peroxide may be used in a solution of 2% to 5% by volume, although even weaker solutions will be satisfactory. These solutions are applied by wiping or brushing the denture with cotton wool soaked in the solution.

Other organic solvents may be used but they are not so effective, and may require further exposure to light. The general effect of benzoyl peroxide chlorinated solution is that a pink colour which has been obtained by exposure to sunlight will become lighter when wiped with the solution.

In this particular method of effecting the colour change, it is found that the pink colour penetrates somewhat more deeply into the polished surface than when obtained merely by exposure to light, but a particular advantage is that in spite of the normal change of colour which takes place after treatment with the benzoyl peroxide, even if a strong solution is used, there is no excessive bleaching of the denture even after several applications.

In general it is desirable that the materials used should be in a pure form. The invention is not limited to the use of titanium dioxide as other white pigments can be used by adjusting the quantity of colouring matter to suit them. Also there are various grades of titanium dioxide and the quantity of colouring matter is adjusted to obtain the desired pink colour.

It is further to be understood that the various examples above given are merely illustrative of the invention and that other compositions of the rubber compound may be used and that variations in the tone of the pink colour may be obtained by varying any of the factors concerned. It is desirable that in all cases the material should not be overvulcanised, and that the pressure in the vulcaniser should be allowed to drop to zero before the vulcaniser is opened.

This invention considerably simplifies the speedy construction of dental plates by avoiding the necessity of using separate base rubber and pink rubber, and at the same time enables dentures of satisfactory strength, weight and colour to be produced. The following table is given as illustrative of the range of proportions of the improved rubber, but is not to be understood as limiting the scope of the invention to the particular proportions set forth.

| | Percent | | Percent | | Percent |
|---|---|---|---|---|---|
| Rubber | 40 | Rubber | 50 | Rubber | 60 |
| Sulphur | 12 | Sulphur | 15 | Sulphur | 18 |
| Cadmium red | 14 | Cadmium red | 10 | Cadmium red | 7 |
| Titanium dioxide | 34 | Titanium dioxide | 25 | Titanium dioxide | 15 |

I claim:

1. A method of making a denture which comprises mixing crude rubber, red and white pigments and sulphur, the sulphur and crude rubber being present in such proportions that when the mix is vulcanised a hard rubber is produced containing at least 40% by weight of crude rubber, and the pigments in the mix being present in a quantity such that the vulcanised mixture is of colour darker in shade than that finally required, moulding and vulcanising the said mixture, polishing the exposed surface of the vulcanised denture, and treating said exposed surface to lighten the color thereof to the desired shade of pink by applying a solution of a substance selected from the group consisting of benzoyl peroxide and hydrogen peroxide.

2. The method according to claim 1 characterized by applying a solution of benzoyl peroxide in a chlorinated solvent from the group consisting of chloroform, methylene chloride and ethylene dichloride.

CHRISTE JOANNIDES.

REFERENCES CITED

The following references are of record in the file of this patent:

UNITED STATES PATENTS

| Number | Name | Date |
|---|---|---|
| 51,846 | Malcolm | Jan. 2, 1866 |
| 75,766 | Judge | Mar. 24, 1868 |
| 99,956 | Schlesinger | Feb. 15, 1870 |
| 1,212,725 | Wolpe | Jan. 16, 1917 |
| 1,221,083 | Nixon | Apr. 3, 1917 |
| 1,345,819 | Wolfe | July 6, 1920 |
| 1,413,071 | Swartz et al. | Apr. 18, 1922 |
| 1,976,224 | Herrmann et al. | Oct. 9, 1934 |
| 1,983,949 | Semon | Dec. 11, 1934 |
| 2,102,456 | Brill et al. | Dec. 14, 1937 |
| 2,115,034 | Monroe | Apr. 26, 1938 |
| 2,129,203 | Dufour et al. | Sept. 6, 1938 |

FOREIGN PATENTS

| Number | Country | Date |
|---|---|---|
| 12,203 | Great Britain | 1905 |

OTHER REFERENCES

"Organic Syntheses," Gilman & Blatt—second edit. (1941), John Wiley & Sons, N. Y. C., page 432 (note 3). (Copy in Div. 6.)

Johnson, in J. Am. Chem. Soc., vol. 60, page 121-4, U. S. Patent Office Library, abstracted in Chem. Abstracts, vol. 32 (1938), page 1651. (Copy in Div. 6.)

Boeseken et al., Rec. trav. Chem., vol. 43 (1924), page 869, U. S. Patent Office Library, abstracted in Chem. Abstracts, vol. 19, (1925), page 1259. (Copy in Div. 6.)